(12) United States Patent
Matsui et al.

(10) Patent No.: US 9,511,545 B2
(45) Date of Patent: Dec. 6, 2016

(54) METHOD OF MANUFACTURING STRUCTURAL OBJECT

(71) Applicant: Sony Corporation, Tokyo (JP)

(72) Inventors: Takeshi Matsui, Tokyo (JP); Nobuhiro Kihara, Kanagawa (JP); Junichi Kuzusako, Saitama (JP); Tatsuya Minakawa, Kanagawa (JP); Kazuo Niizaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 154 days.

(21) Appl. No.: 14/368,326

(22) PCT Filed: Nov. 9, 2012

(86) PCT No.: PCT/JP2012/007204
§ 371 (c)(1),
(2) Date: Jun. 24, 2014

(87) PCT Pub. No.: WO2013/102963
PCT Pub. Date: Jul. 11, 2013

(65) Prior Publication Data
US 2015/0004403 A1 Jan. 1, 2015

(30) Foreign Application Priority Data
Jan. 5, 2012 (JP) .................................. 2012-00637

(51) Int. Cl.
*B29C 41/22* (2006.01)
*B29C 41/48* (2006.01)
(Continued)

(52) U.S. Cl.
CPC ....... *B29C 67/0074* (2013.01); *B29C 67/0051* (2013.01); *B29C 67/0077* (2013.01);
(Continued)

(58) Field of Classification Search
CPC ...... B29C 41/22; B29C 41/48; B29C 67/0051; B29C 67/0074; B29C 67/0077; B29C 67/0081; B29C 69/001; B29C 70/68; B29C 70/681; B29C 70/682
(Continued)

(56) References Cited

U.S. PATENT DOCUMENTS

| | | | | |
|---|---|---|---|---|
| 4,863,538 A | * | 9/1989 | Deckard | B29C 67/0077 264/497 X |
| 5,482,659 A | * | 1/1996 | Sauerhoefer | B29C 71/0009 264/156 |

(Continued)

FOREIGN PATENT DOCUMENTS

| | | |
|---|---|---|
| EP | 2402386 | 1/2012 |
| JP | 4069245 | 4/2008 |

(Continued)

*Primary Examiner* — Leo B Tentoni
(74) *Attorney, Agent, or Firm* — Chip Law Group

(57) ABSTRACT

There is provided a method of manufacturing a structural object, including using rapid prototyping technology, forming a structure body from a powder material whose main component is a water-soluble compound. The formed structure body is impregnated with an adhesive that provides adhesive function upon reaction with moisture contained in the structure body.

9 Claims, 10 Drawing Sheets

(51) Int. Cl.
*B29C 70/68* (2006.01)
*B29C 67/00* (2006.01)
*B29C 69/00* (2006.01)
B29K 105/00 (2006.01)
B29L 22/00 (2006.01)

(52) U.S. Cl.
CPC ...... *B29C 67/0081* (2013.01); *B29C 67/0085* (2013.01); *B29C 69/001* (2013.01); *B29C 70/681* (2013.01); *B29C 70/682* (2013.01); B29K 2105/0097 (2013.01); B29K 2105/251 (2013.01); B29K 2995/0062 (2013.01); B29L 2022/00 (2013.01); Y10T 428/28 (2015.01)

(58) Field of Classification Search
USPC ....... 264/113, 128, 129, 138, 154, 155, 156, 264/250, 255, 259, 460, 461, 462, 463, 264/497
See application file for complete search history.

(56) References Cited

U.S. PATENT DOCUMENTS

| 8,105,517 | B2 | 1/2012 | Suzuki et al. |
| 2004/0138336 | A1 | 7/2004 | Bredt et al. |
| 2005/0074596 | A1* | 4/2005 | Nielsen ............... B29C 67/0059 264/497 X |
| 2010/0214333 | A1* | 8/2010 | Matsui ............... B29C 67/0081 347/8 |

FOREIGN PATENT DOCUMENTS

| WO | 94/12284 | 6/1994 |
| WO | 2007/122804 | 11/2007 |

* cited by examiner

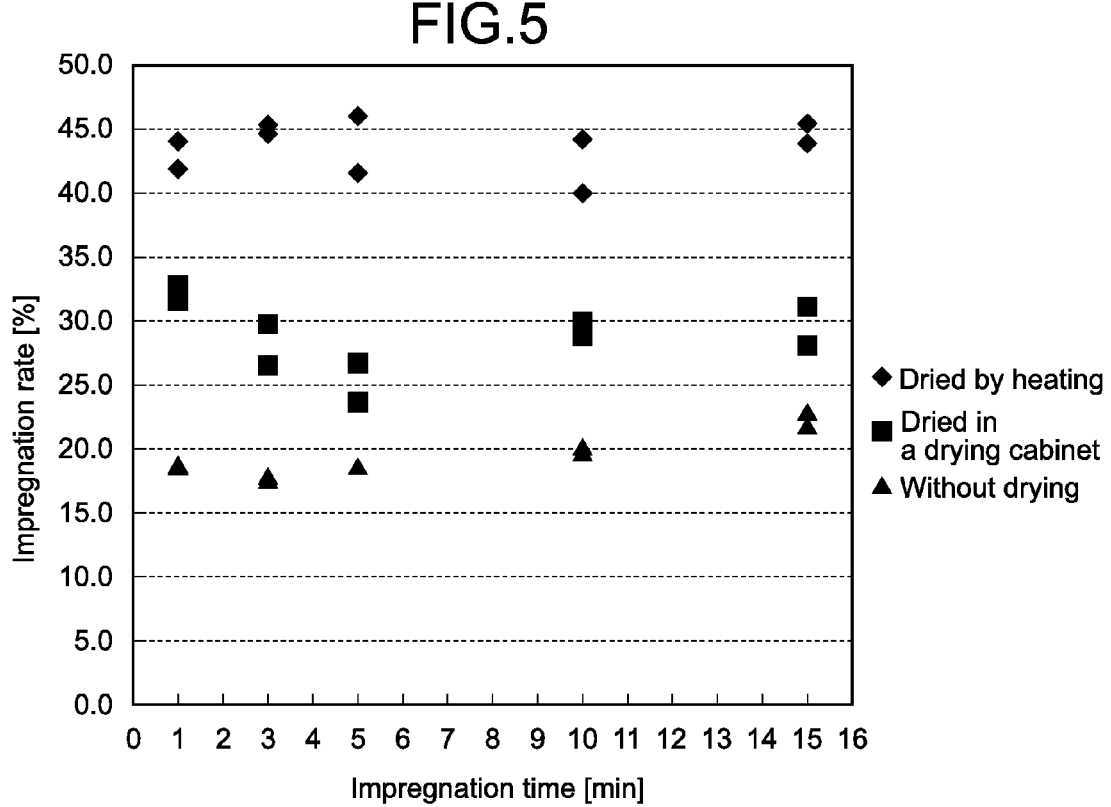

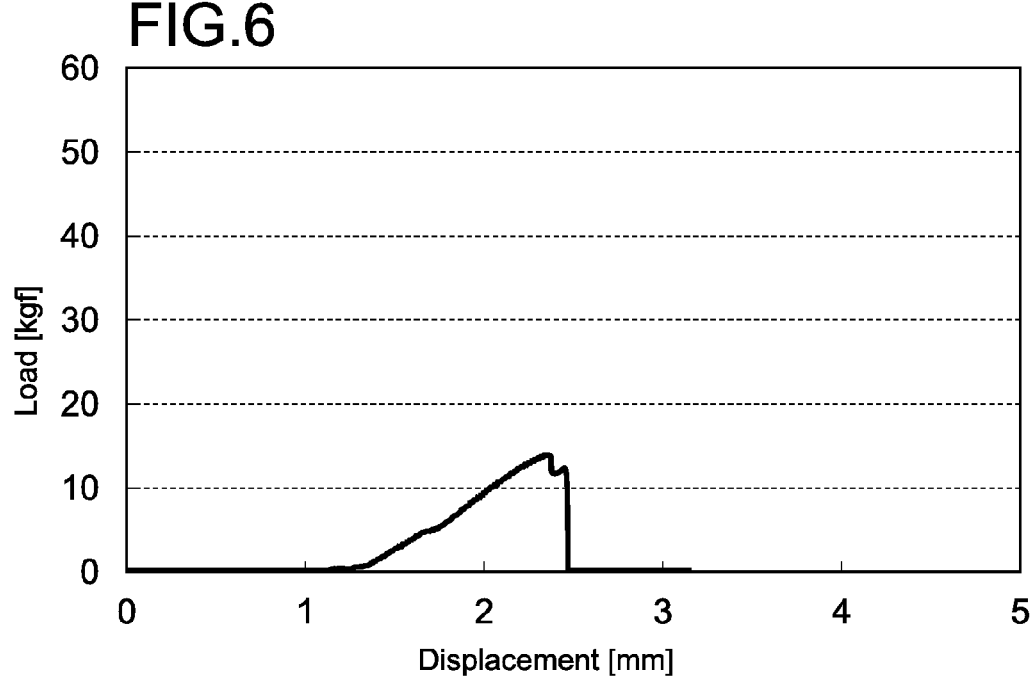
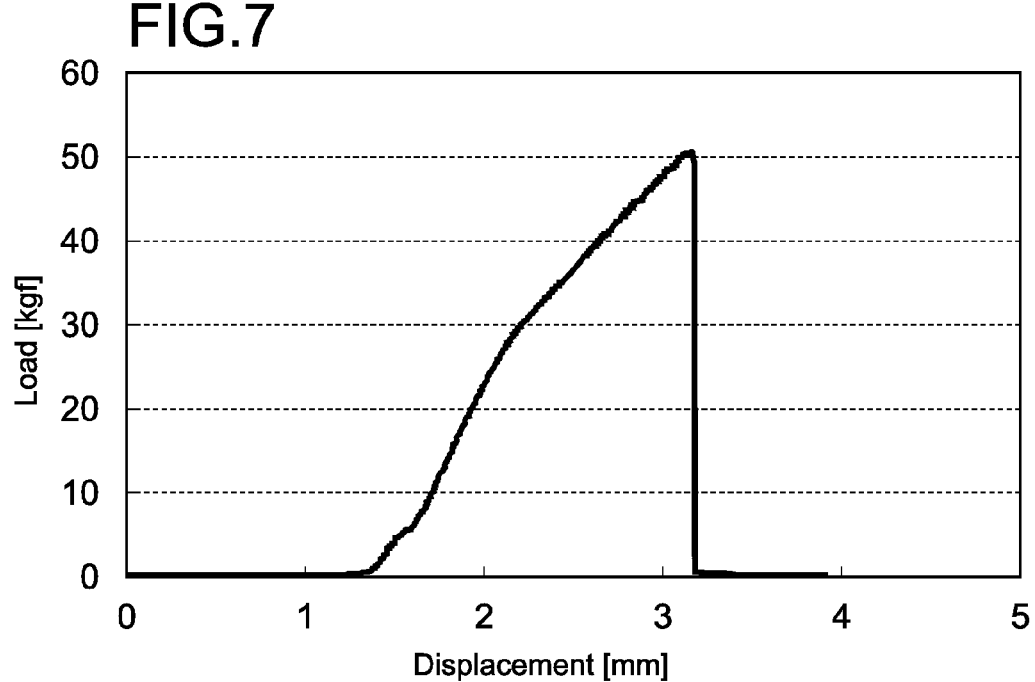

FIG.8

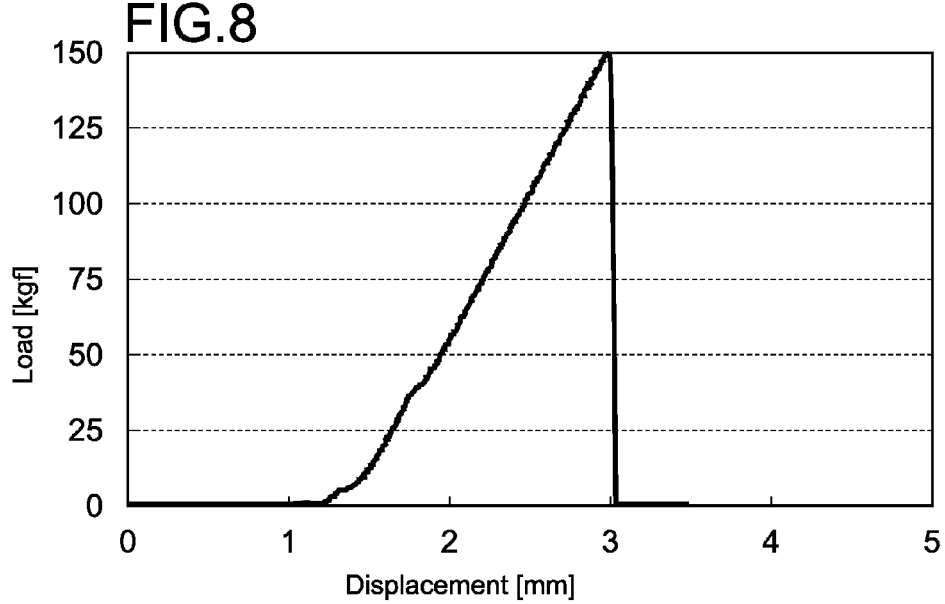

FIG.9

| Comparison items | Process | | | Remarks |
|---|---|---|---|---|
| | Impregnated without the drying process (Pattern a) | Impregnated after being dried (Pattern b) | Impregnated after the drying process (Pattern c) | |
| Weight | 100 | 95 | 90 | Freshly-formed = 100 |
| Weight loss | 0 | 5 % | 10 % | |
| Weight after impregnation | 115~120 | 120~125 | 130~135 | |
| Impregnation rate | 15~20 % | 25~30 % | 45~50 % | |
| Fracture strength | 1 | 3.3 | 10 | Freshly-formed = 1 |
| Fracture load | 15 kgf | 50 kgf | 150 kgf | |
| Thickness of curing | | | | Measured value of a test piece (15 mm square) |
| Front (printed) surface | 0.7 | 1.3 | 15.0 (Completely impregnated) | |
| Back surface | 1.3 | 1.9 | 15.0 (Completely impregnated) | |
| Side surface | 1.3 | 2.5 | 15.0 (Completely impregnated) | |
| Schematic diagram showing thickness of curing | | | | |

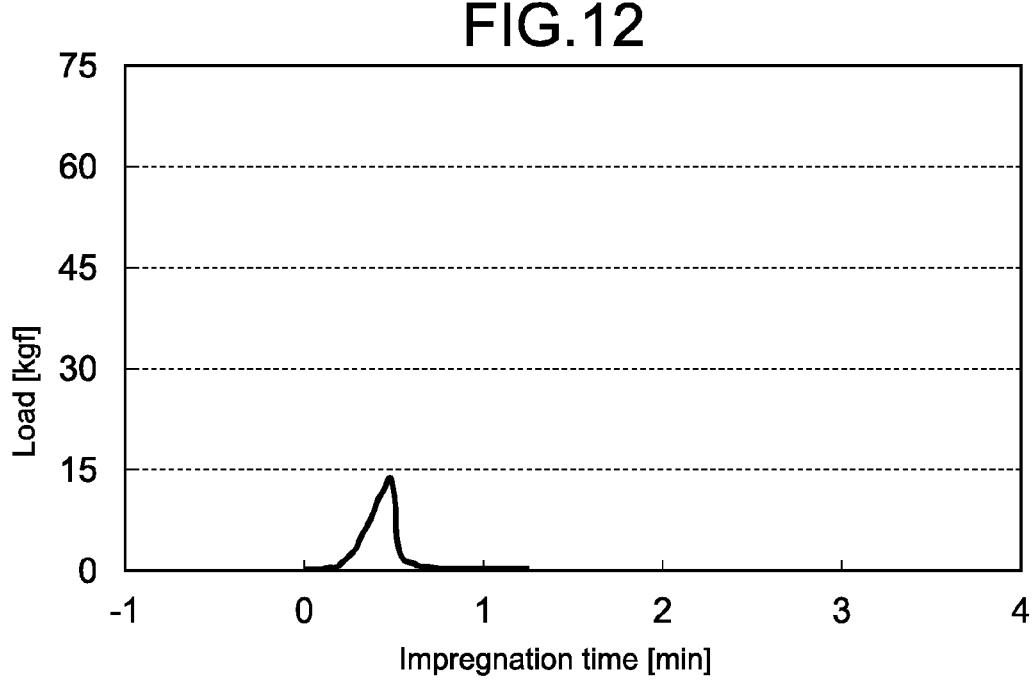
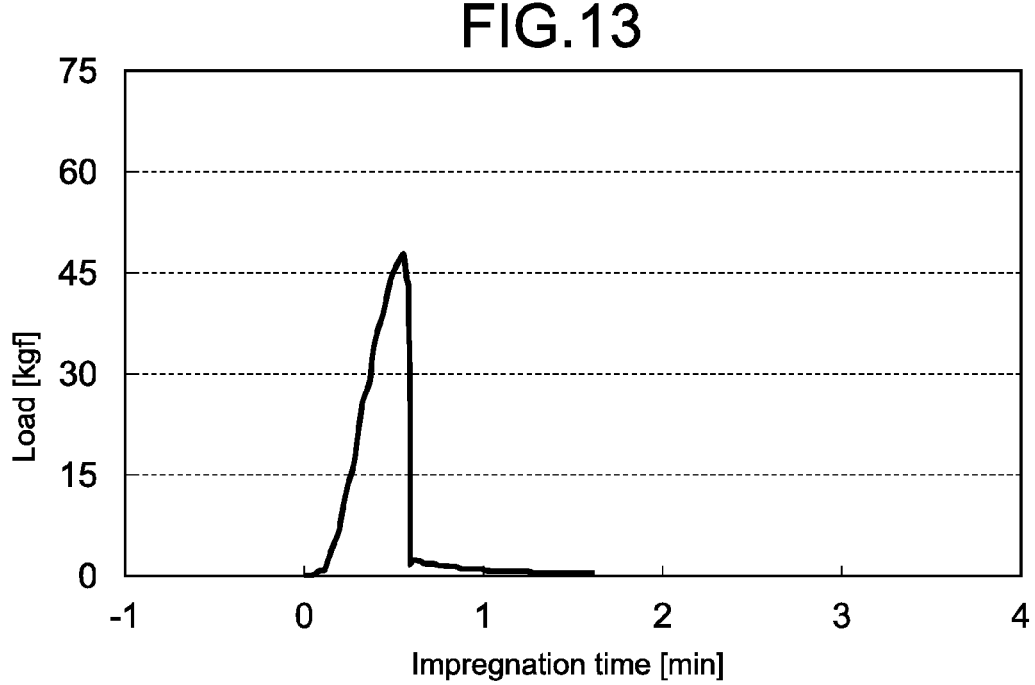

| Comparison items | Process | | Remarks |
|---|---|---|---|
| | Without impregnation | With impregnation | |
| Weight | 100 | 115 | Not impregnated = 100 |
| Impregnation rate | | 15 % | |
| Fracture strength | 1 | 3.3 | Not impregnated = 1 |
| Fracture load | 15 kgf | 50 kgf | |
| Thickness of curing | | | Measured value of a test piece (15 mm square) |
| Front (printed) surface | 0 | 1.7 | |
| Back surface | 0 | 2.0 | |
| Side surface | 0 | 1.5 | |
| Schematic diagram showing thickness of curing | | | |

METHOD OF MANUFACTURING STRUCTURAL OBJECT

CROSS REFERENCES TO RELATED APPLICATIONS

The present application is a national stage of International Application No. PCT/JP2012/007204 filed on Nov. 5, 2012 and claims priority to Japanese Patent Application No. 2012-000637 filed on Jan. 5, 2012, the disclosure of which is incorporated herein by reference.

BACKGROUND

The present disclosure relates to a method of manufacturing a structural object using a rapid prototyping technology and the structural object.

From the past, a modeling apparatus using a rapid prototyping technology has mainly been used for professional use. As main methods thereof, there are stereolithography, laminated object manufacturing, and modeling with powders. The stereolithography is a method for forming a three-dimensional shape by irradiating a light-curable resin with laser to form a cross-sectional shape of the shaped object, layer by layer and then laminating them. The laminated object manufacturing is a method for forming a three-dimensional shape by cutting out thin sheets, layer by layer, in accordance with the cross-sectional shape of the shaped object and then bonding and laminating. The modeling with powders is a method for forming a three-dimensional shape by laying a layer of powder material to form a cross-sectional shape of the shaped object, layer by layer and then laminating them.

The modeling with powders is roughly divided into methods of melting or sintering powders, and those of solidifying using an adhesive. The former forms the cross-sectional shape by irradiating nylon material, for example, with a laser. The latter solidifies powder material containing gypsum as the main component by ejecting the adhesive to the powder material using an inkjet head, and forms the cross-sectional shape.

In the modeling with powders with the use of an inkjet head, a head of a commercially available inkjet printer is used, and operates on a sheet in which the gypsum powder has been laid as if printing is performed. There is used gypsum as the powder material, and from the print head, the adhesive for solidifying the gypsum is ejected.

Image forming composition described in Patent Literature 1 contains gypsum and a polyvinyl alcohol resin. In the method of manufacturing a three-dimensional structure body according to Patent Literature 1, the above-mentioned image forming composition in powder form is used, its cross-sectional shape is patterned by adding a small amount of water, and the cross-sectional layers thereof are laminated. Thus, the three-dimensional structure body is formed. Further, by adding the water and cross-linking agent to the three-dimensional structure body, there can be obtained a three-dimensional structure body having a desired intensity (for example, see paragraphs 0026 and 0031 in the specification of Patent Literature 1).

In addition, contents described in Patent Literature 2 include that, in a modeling method using the modeling with powders, water-soluble material is used as the powder material (for example, see paragraph 0017 in the specification of Patent Literature 2).

CITATION LIST

Patent Literature

[PTL 1]
WO 2007/122804
[PTL 2]
Japanese Patent No. 4069245

SUMMARY

Technical Problem

Meanwhile, in order to secure the desired intensity of the three-dimensional structure body formed by using the rapid prototyping technology as described above, for example, there is a need for devising depending on materials included in the structural object and applications of the structural object.

In view of the circumstances as described above, it is desirable to provide a structural object having a predetermined intensity whose main component is a water-soluble compound, and a method of manufacturing the same.

Solution to Problem

According to an embodiment of the present disclosure, there is provided a method of manufacturing a structural object, including using rapid prototyping technology, forming a structure body from a powder material whose main component is a water-soluble compound.

The formed structure body is impregnated with an adhesive that provides adhesive function upon reaction with moisture contained in the structure body.

An intensity of the structure body formed by rapid prototyping technology, from the powder material whose main component is the water-soluble compound, is relatively low in the structure body alone. By impregnating this structure body with the adhesive that reacts with moisture contained in the structure body, the predetermined intensity can be obtained.

The method of manufacturing the structural object may further include drying the structure body, before impregnating with the adhesive. By drying the structure body, the structure body would easily absorb the adhesive, and up to relatively inner side of the structure body can be impregnated with the adhesive. The adhesive would exhibit the adhesive function by reacting with residual moisture contained in the structure body after the drying.

The drying of the structure body may include heating the structure body. This allows the drying of the structure body to be facilitated.

In the process of impregnation with the adhesive, an impregnation rate of the adhesive to the structure body may be controlled in such a manner that the structural object to be obtained by the impregnation with the adhesive has an inner part in which the adhesive is not contained and a surface part in which the adhesive is contained. This allows to make difference to an intensity of the inner part in which the adhesive is not contained and an intensity of the surface part in which the adhesive is contained.

The intensity of the surface part of the structural object to be obtained by the impregnation with the adhesive may be 10 times or more and 250 times or less relative to the intensity of the inner part.

The method of manufacturing the structural object may further include forming a hole to penetrate through from the surface part to the inner part of the structural object to be obtained by the impregnation. In that case, in the formed hole, by injecting a solvent for the powder material and eluting the powder material, there may be formed a hollow structure at least at a part of the inner part. This allows the structural object including the hollow structure to be manufactured relatively easily.

There may be used a technology of modeling with powders out of the rapid prototyping technology. Sodium chloride may be used as the main component of the powder material.

According to an embodiment of the present disclosure, there is provided a structural object including a structure body that has a powder material whose main component is a water-soluble compound, and has been formed by solidifying the powder material by adhesive function of a first adhesive.

The structure body is impregnated with a second adhesive that provides adhesive function upon reaction with moisture contained in the structure body.

The intensity of the structure body, formed by the powder material whose main component is the water-soluble compound, is relatively low in the structure body alone. By impregnating this structure body with the second adhesive that reacts with moisture contained in the structure body, the predetermined intensity can be obtained.

Advantageous Effect of Invention

As described above, according to the present disclosure, it is possible to allow a structural object, whose main component is a water-soluble compound, to have a predetermined intensity.

Additional features and advantages are described herein, and will be apparent from the following Detailed Description and the figures.

BRIEF DESCRIPTION OF THE FIGURES

FIG. 5 is a graph showing relation between impregnation time and impregnation rate in the case of three processing patterns of a plurality of test pieces.

FIG. 6 is a graph showing a fracture curve in the case where the formed test piece was subjected to a process of impregnation with an adhesive without performing a drying process.

FIG. 7 is a graph showing a fracture curve in the case where the formed test piece was dried by storage in a drying cabinet for half a day and then subjected to the process of impregnation with the adhesive.

FIG. 8 is a graph showing a fracture curve in the case where the formed test piece was subjected to a drying process by heating and then subjected to the process of impregnation with the adhesive.

FIG. 9 is a table that summarizes the experimental results for the three processing patterns.

FIG. 12 is a graph showing a fracture curve of a test piece (without the impregnation process) of gypsum.

FIG. 13 is a graph showing a fracture curve of a test piece (with the impregnation process) of gypsum.

DETAILED DESCRIPTION

Hereinafter, embodiments of the present disclosure will be described with reference to the drawings.

Method of Manufacturing a Structural Object

In the description hereinafter, for ease of understanding of explanation, wordings will be used selectively as follows.

A shaped object that has been formed by a rapid prototyping technology using a modeling apparatus will be referred to as a "structure body".

On the other hand, the structure body that has been impregnated with an after-mentioned adhesive used for a purpose of curing the structure body formed in such a manner, and in which the structure body has a cured layer being formed at least at a part of the structure body will be referred to as a "structural object".

Figure 1:
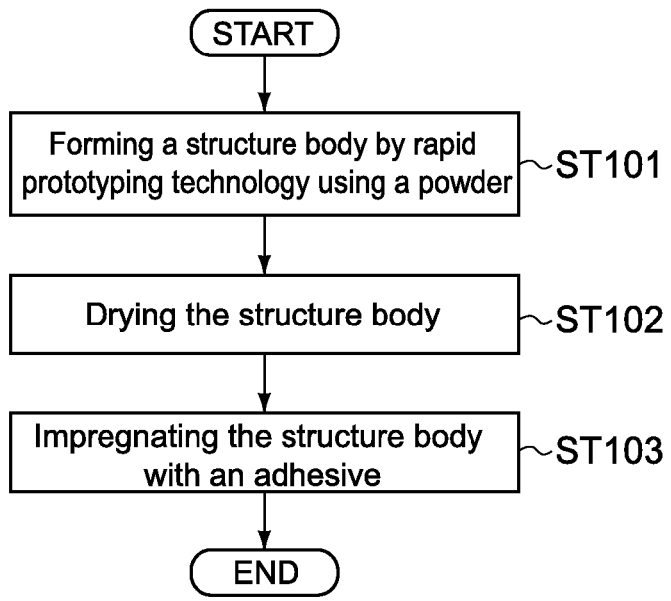
FIG. 1 is a flowchart showing a method of manufacturing a structural object according to an embodiment of the present disclosure.

FIG. 1 is a flowchart showing a method of manufacturing a structural object according to an embodiment of the present disclosure.

Process of Forming a Structure Body

In step 101, using a powder material, a structure body is formed by using a technology of modeling with powders out of rapid prototyping technology. The powder material will hereinafter be referred simply to as "powder".

There may be used various known modeling apparatus as an apparatus to realize the rapid prototyping. Among them, for example, modeling apparatus that are described in Japanese Patent Application Laid-open Nos. 2010-194942, 2010-208069, 2011-156678 and others may be used. These modeling apparatus include at least a modeling area that houses the powder, and a nozzle that ejects a liquid material to the powder housed in the modeling area. Layer by layer, the nozzle ejects the liquid material selectively to the powder in the modeling area, by an inkjet method in accordance with the tomographic image data such as CT.

As the powder, a material where the whole or part of the material of the powder is a water-soluble compound may be used. When the part of the powder is the water-soluble compound, the water-soluble compound is the main component of the powder. The water-soluble compounds, although not particularly limited, include at least one of alkali metal salts and alkaline earth metal salts. The alkali metal salts, for example, in addition to alkali metal halide salts such as sodium chloride (salt), potassium chloride, sodium iodide and sodium bromide, include organic acid salts of sodium acetate and the like. The alkaline earth metal salts, for example, in addition to alkaline earth metal halide salts such as calcium chloride and magnesium chloride, include sulfates of calcium sulfate and magnesium sulfate and the like.

A soluble organic polymer, although not particularly limited, may be selected appropriately in accordance with such as types of the water-soluble compound to be used. For example, polyvinylpyrrolidone, polyvinyl alcohol, polyethylene glycol, cellulose derivatives (methyl cellulose, ethyl cellulose, ethyl hydroxymethyl cellulose, carboxymethyl cellulose, and hydroxymethyl cellulose), gum arabic, gelatin, starch, wheat flour and the like can be mentioned. In the embodiment of the present disclosure, among them, typically a water-soluble organic polymer such as polyvinylpyrrolidone and polyvinyl alcohol is used.

Typically, average particle sizes of these powders are 350 micrometer (um) or less, and particularly may be between 10 um and 150 um, but are not limited thereto. A reason for the above-mentioned value of the average particle size of the powder is that when the particle size is excessive, roughness of the surface of the forming die may increase and lead to lowering of accuracy of molding, and when the particle size is not large enough, at the time of deploying of the powder, the powder may scatter or tend to cause clogging of the nozzle for discharging the liquid material. Thus, for example, the powder in sizes between 20 um and 30 um may also be suitably used. It is possible to produce a structure body with higher accuracy, by adopting an average particle size within the above range.

The soluble organic polymer serves as a binder (first adhesive) between particles of the water-soluble compound described above. Thus, as the liquid material which will be described next, a material in which components of the adhesive is not contained is used. Alternatively, when the soluble organic polymer is not contained in the powder, the liquid material contains a component of the adhesive.

The liquid material to be ejected from the nozzle may be any one containing at least one of water-miscible organic solvents and water. The water-miscible organic solvents include, for example, lower alcohols (such as ethanol, methanol and propanol), ketones (such as acetone, methyl ethyl ketone, methyl propyl ketone and isopropyl methyl ketone), alkyl acetate (such as methyl acetate and ethyl acetate) and the like. Further, a solution of water-soluble compounds being dissolved in these liquids may also be used. In addition, solutions of water-soluble compounds being dissolved in these liquids may also be used. As the water-soluble compounds mentioned in here, the same as those used in the powder described above can be used. In particular, there may be used the water-soluble compound that has an effect of increasing adhesion strength of the powder by a synergistic action with the powder. A concentration in this case is non-limited, and typically, the concentration of the water-soluble compound can be set appropriately, with an upper limit that is solubility in the water-miscible organic solvent or water at a predetermined temperature (saturation solubility).

Process of Drying the Structure Body

In step 102, a process of drying the structure body formed by the rapid prototyping technology is carried out. As methods of the process of drying, there is a variety of ways such as allowing it to stand for a predetermined period of time in normal room condition, storing in a drying cabinet, allowing it to stand for a predetermined period of time under direct sunlight, and drying by heating using a heating apparatus.

As means of the heating using the heating apparatus, for example, there may be used an infrared heater, a far-infrared heater, resistance heaters and the like, microwaves and the like, and any as the heating means. These methods of heating may be used selectively, in accordance with morphologies (such as shapes and sizes) of the structure body, applications of the structure body, or by the heating temperatures and the like.

The degree of drying of the structure body can be set appropriately by the drying time (including heating time and the like). For example, the heating temperature and the heating time are, at 100 degrees C. or more and 200 degrees C. or less for 30 minutes or more and 60 minutes or less. However, these heating temperature and heating time also depend on size of the structure body.

It should be noted that this process of drying is not an essential process in the present disclosure.

Process of Impregnation with the Adhesive

In step 103, the structure body after the process of drying is impregnated with an adhesive (second adhesive). As methods of the impregnation process, there can be appropriately selected dip method, spray method, coating method (application, or embrocation) and the like. Hereinafter, for ease of understanding of explanation, this adhesive may also be described as "impregnating adhesive".

An impregnation rate of the impregnating adhesive, as will be described later, is controlled at least by the degree of drying of the structure body. By the controlling of the impregnation rate of the impregnating adhesive, a thickness of the cured layer of the structural object is able to be controlled. As a result, it is made possible to manufacture the structural object including an uncured layer in addition to the cured layer.

As this impregnating adhesive, an adhesive that generates adhesive function by reacting with moisture contained in the structure body is used. Typically, a cyanoacrylate-based adhesive is used. However, an adhesive of thermosetting or photocurable type may also be used as the impregnating adhesive, where the structure body may be cured by thermal irradiation or light irradiation. As a photocurable resin, for example, a UV-curable resin can be mentioned.

Even after the structure body has been dried, by a reaction of the impregnating adhesive with residual moisture contained in the structure body, the structure body would be cured in the area of the reaction. Even after the structure body has been dried, by a reaction of the residual moisture contained in the structure body with the impregnating adhesive, the structure body is allowed to cure in the reaction area. The residual moisture contained in the structure body would include moisture in air (humidity) of an environment where the structure body is located.

For example, in a case where the drying process of above-mentioned step 102 is not performed, most of the moisture contained in the structure body is moisture that is contained in the liquid material described in the process of forming the structure body by the modeling apparatus. When the impregnation process with the impregnating adhesive in step 103 has been performed without performing the drying process, the moisture contained in the structure body and the impregnating adhesive would react in full in relatively only surface of the structure body, and the impregnating adhesive would not penetrate to inner side of the structure body. In this case, the structural object with different intensities between an inner part and a surface part is able to be obtained.

As described above, in this embodiment, the structure body formed by the modeling apparatus, whose intensity is relatively low in the structure body alone, is able to obtain the predetermined intensity by the process of impregnation with the adhesive.

In addition, by the process of drying the structure body, the structure body would easily absorb the adhesive, and up to relatively inner side of the structure body can be impregnated with the adhesive.

Process of Forming a Coating Layer

Figure 2:
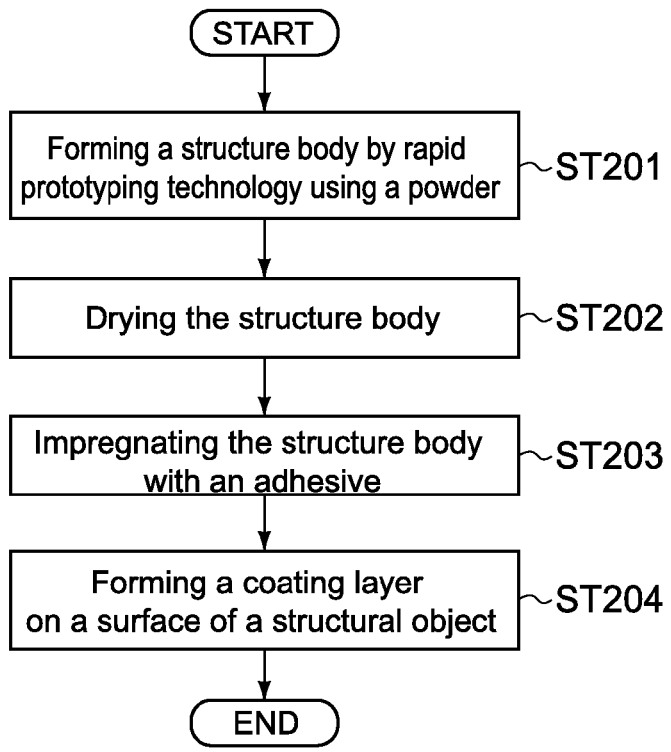
FIG. 2 is a flowchart showing a method of manufacturing a structural object according to another embodiment of the present disclosure.

FIG. 2 is a flowchart showing a method of manufacturing a structural object according to another embodiment of the present disclosure. In the following, descriptions, the same part as what was described in the above-described embodiment regarding FIG. 1, will be simplified or omitted, and different point(s) will be mainly described.

Processes in steps 201 to 203 are the same as steps 101 to 103 shown in FIG. 1. In step 204, a coating layer is formed on a surface of the structure body that includes the impregnating adhesive (structural object). As methods of the process of forming the coating layer, there can be mentioned dip, spray, application or embrocation, or vapor deposition and others. As the material of the coating layer, a fluorine-based coating material may be used. A thickness of the coating layer is, for example, between 10 um and 50 um, or between 10 um and 100 um, but not limited to these ranges.

This coating layer may be formed of a plurality of layers. For example, the coating layer may include a base layer and an upper layer thereof. As the material of the base layer, for example, a silicone may be used.

By the forming of the coating layer on the surface of the structural object that has been formed by being cured with the impregnating adhesive, it is possible to maintain good condition of the structural object.

In a case the structural object does not have the coating layer and the structure body, as described above, includes as its main component a salt for the water-soluble compound when the roughness of the surface of the structure body is large, the structure body may easily absorb moisture of outside air from its surface and cause the salt to be eluted. Moreover, a component of the salt may adsorb the moisture of the outside air and cause water droplets to be generated on the surface of the structural object. In this embodiment, by the forming of the coating layer on the surface of the structural object, adverse effects on the structural object of humidity and temperature surrounding the structural object are able to be avoided.

Process of Forming a Hollow Structure

In the case that not the whole of the structural object has been impregnated with the impregnating adhesive, and the structural object has an uncured layer at least at a part of its inner part, there may be formed a hollow structure to the structural object as follows. For example, after step 102 shown in FIG. 1, a hole to penetrate through from the surface part to the inner part of the structural object is formed. Through the hole, to the inner part of the structural object, a solvent for the powder is injected. This allows the powder of the uncured portion to be eluted. Thus, the powder in an uncured part is eluted. In that part, a hollow part is to be formed. This allows the structural object including the hollow structure to be manufactured relatively easily.

It should be noted that alternatively, this process of forming the hollow structure may be performed after step 202 shown in FIG. 2 and before step 203, or, after step 203.

Experimental Example 1 of Manufacturing a Structural Object

The inventors of the present disclosure used (A) a powder whose main component is sodium chloride and (B) a powder whose main component is gypsum, to fabricate each structure body (test pieces 15 by 15 by 15 (mm) in size) thereof. As for a size of the test piece of the structure body there was used a rectangular-shaped test piece with a cross-section of 15 by 15 (mm), or, a test piece made to be about 40 (mm) in length with a cross-section of 15 by 15 (mm).

(A) the Structure Body by Sodium Chloride

By the rapid prototyping technology, using the inkjet print head, a water-based ink as the liquid material in which the adhesive is not contained was ejected to the powder of sodium chloride including a binder, and thus a test piece structure body was formed.

(1) the Case without the Process of Impregnation with the Adhesive

Figure 3:
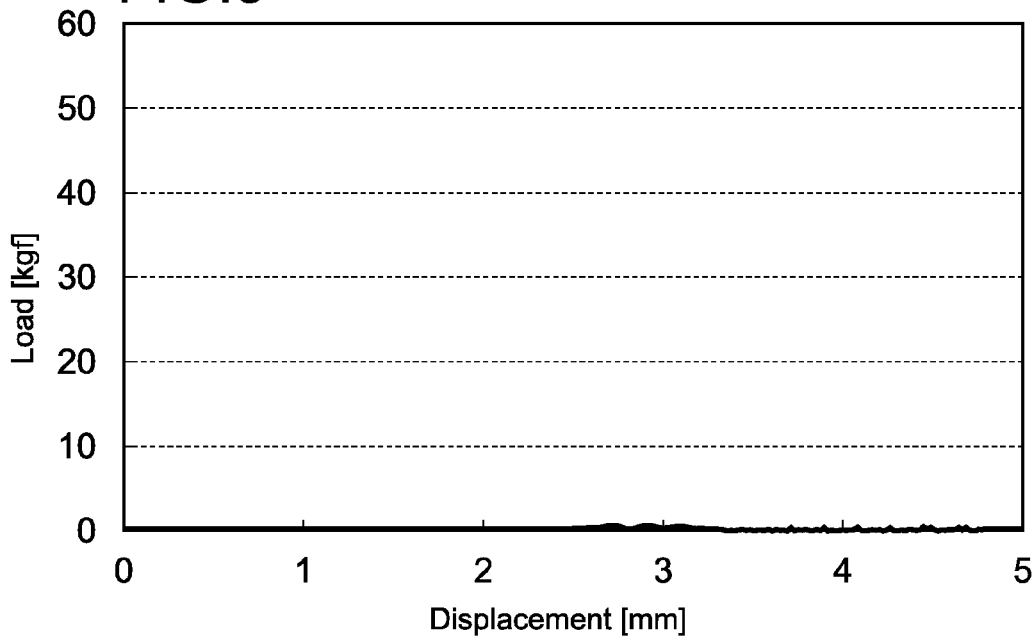
FIG. 3 is a graph showing a fracture curve of a test piece structure body freshly-formed by a modeling apparatus.

FIG. 3 is a graph showing a fracture curve of the test piece structure body freshly-formed by the modeling apparatus. The horizontal axis shows a displacement of the test piece structure body, and the vertical axis shows its fracture load. The fracture load was about 0.7 kgf. The test piece structure body freshly-formed by the modeling apparatus, that is, the test piece structure body which has not been subjected to a drying process (hereinafter referred simply to as "test piece") contains moisture and is brittle as the experiment showed.

Figure 4:
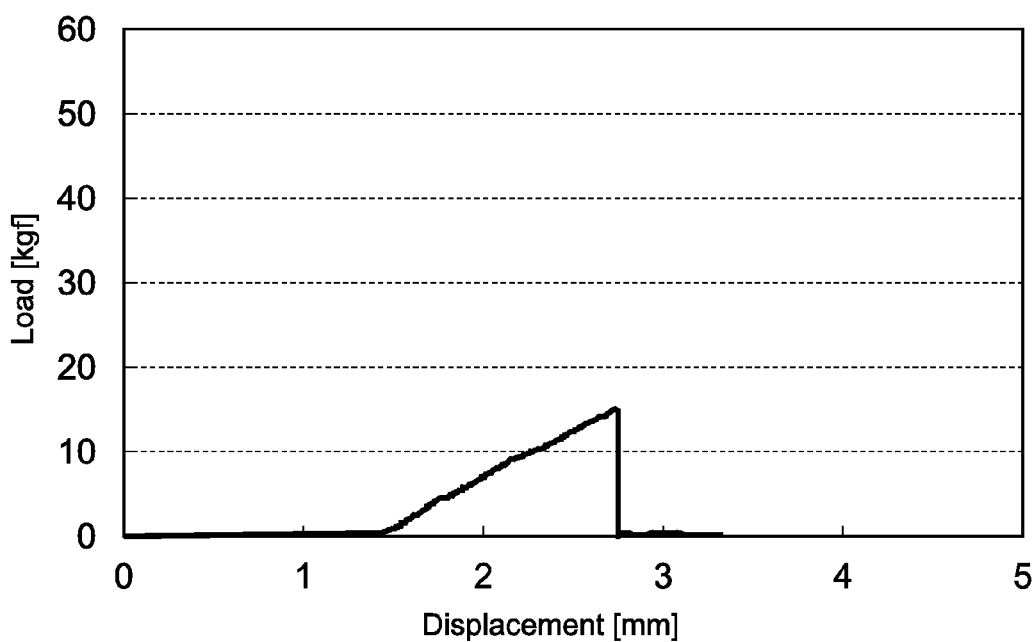
FIG. 4 is a graph showing a fracture curve in the case where the test piece has been dried by heating.

FIG. 4 is a graph showing a fracture curve in the case where the test piece has been dried by heating. The fracture load was about 15 kgf.

(2) the Case with the Process of Impregnation with the Adhesive

FIG. 5 is a graph showing relation between impregnation time and impregnation rate in the case of the following three processing patterns of a plurality of the test pieces.

Pattern a: Without a drying process.
Pattern b: Subjected to a drying process in a drying cabinet.
Pattern c: Subjected to a drying process by heating.

As the impregnating adhesive, a cyanoacrylate-based adhesive was used. The heating temperature and time for drying by heating were, as described above, at 100 degrees C. or more and 200 degrees C. or less for 30 minutes or more and 60 minutes or less. This graph shows that, regardless of the impregnation time, the impregnation rate of the adhesive is controlled by the degree of drying of the structure body. In addition, needless to say, the impregnation rate of the adhesive may also be controlled by the amount of the adhesive.

(Pattern a)

FIG. 6 is a graph showing a fracture curve in the case where the formed test piece was subjected to the process of impregnation with the adhesive without performing the drying process.

An amount of weight increase of the test piece structure body after the process of impregnation was 15% to 20%. This amount of the weight increase is the amount of the impregnating adhesive that has soaked into the surface of this test piece. The fracture load, on average of the plurality of the test pieces, was about 15 (kgf). A thickness of the cured layer by this process of impregnation, on average of the plurality of the test pieces, was about 0.7 mm (front (printed) surface), 1.3 mm (back surface), and 1.3 mm (side surface).

The following data is a sample of characteristic values of one structural object that has been arbitrarily selected out of the test pieces of the structural objects manufactured by Pattern a.

Weight after the process of impregnation: 8.26 (g)
Fracture load: 15.7 (kgf) (154 (N))
Weight ratio of the adhesive: 20.2(%)

In addition, for reference, the following data is characteristic values of the test piece whose main component is sodium chloride, freshly-formed by the modeling apparatus, and not performing the process of impregnation to the test piece.

Weight: 6.51 (g)
Fracture load: 0.7 (kgf) (6.9 (N))

(Pattern b)

FIG. 7 is a graph showing a fracture curve in the case where the formed test piece was dried by storage in the drying cabinet for half a day and then subjected to the process of impregnation with the adhesive.

An amount of weight increase of the test piece structure body after the process of impregnation was 25% to 30%.

The fracture load on average was about 50 kgf.

A thickness of the cured layer by this process of impregnation, on average, was about 1.3 mm (front (printed) surface), 1.9 mm (back surface), and 2.5 mm (side surface). The thickness of the cured layer in the case where the drying process was performed was about 1.5 to 2 times than that in the case without the drying process.

The following data is a sample of characteristic values of one structural object that has been arbitrarily selected out of the test pieces of the structural objects manufactured by Pattern b.

Weight after drying and before the process of impregnation: 6.11 (g)
Weight after the process of impregnation: 8.60 (g)
Fracture load: 52.4 (kgf) (514 (N))
Weight ratio of the adhesive: 29.0(%)

(Pattern c)

FIG. 8 is a graph showing a fracture curve in the case where the formed test piece was subjected to the drying process by heating and then subjected to the process of impregnation with the adhesive.

The fracture load on average was about 150 kgf.

By this process of impregnation, the whole volume of one test piece was cured.

The following data is a sample of characteristic values of one structural object that has been arbitrarily selected out of the test pieces of the structural objects manufactured by Pattern c. As conditions for drying by heating, the temperature was at 100 degrees C., and the heating was of 40 (min).

Weight after drying and before the process of impregnation: 5.86 (g)

After this, as a result of the impregnation process with the cyanoacrylate-based adhesive, the following characteristics of the test piece were obtained.

Weight after the process of impregnation: 10.8 (g)
Fracture load: 153.2 (kgf) (1500 (N))
Weight ratio of the adhesive: 46.5(%)

FIG. 9 is a table that summarizes the experimental results for the three Patterns a, b and c in "(2) The case with the process of impregnation with the adhesive". Regarding the test piece freshly-formed by the modeling apparatus, that is, which has not been subjected to a drying process, its weight was assumed to be 100, and its fracture strength was assumed to be 1.

Figure 10A:
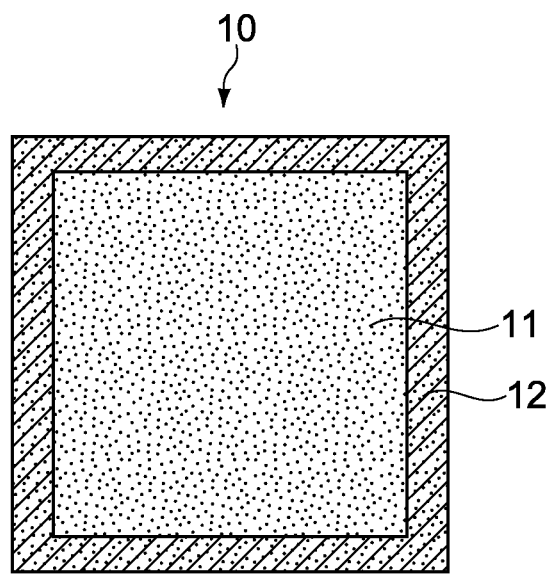
FIGS. 10A and 10B are schematic cross-sectional diagrams of a structural object with different intensities between an inner part and a surface part.
Figure 10B:
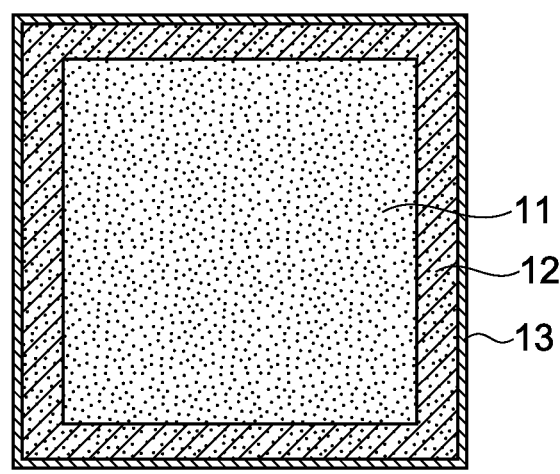

FIG. 10A is a schematic cross-sectional diagram of the structural object formed by the above-mentioned Patterns a or b. As shown in FIG. 10A, in the test piece of Patterns a and b, the intensity of surface part (cured layer) 12 of the structural object and the intensity of inner part (uncured layer) 11 thereof differed. In this structural object 10, it had a double structure whose surface part 12 is hard and the inner part 11 is softer than that. FIG. 10B is a schematic cross-sectional diagram of the structural object on which the above-mentioned coating layer 13 was formed.

In the explanation described above, the cyanoacrylate-based impregnating adhesive was explained to provide the adhesive function by reacting with the moisture. In Pattern c, the moisture content in the test piece after the process of drying by heating is relatively low. Therefore, it can be considered that after once the impregnating adhesive soaked the whole of the structure body, the structure body absorbs the moisture in the surrounding air, and it allows the impregnating adhesive being soaked into the whole of the structure body to react with the moisture, and thus the whole of the structure body is cured.

Figure 11A:
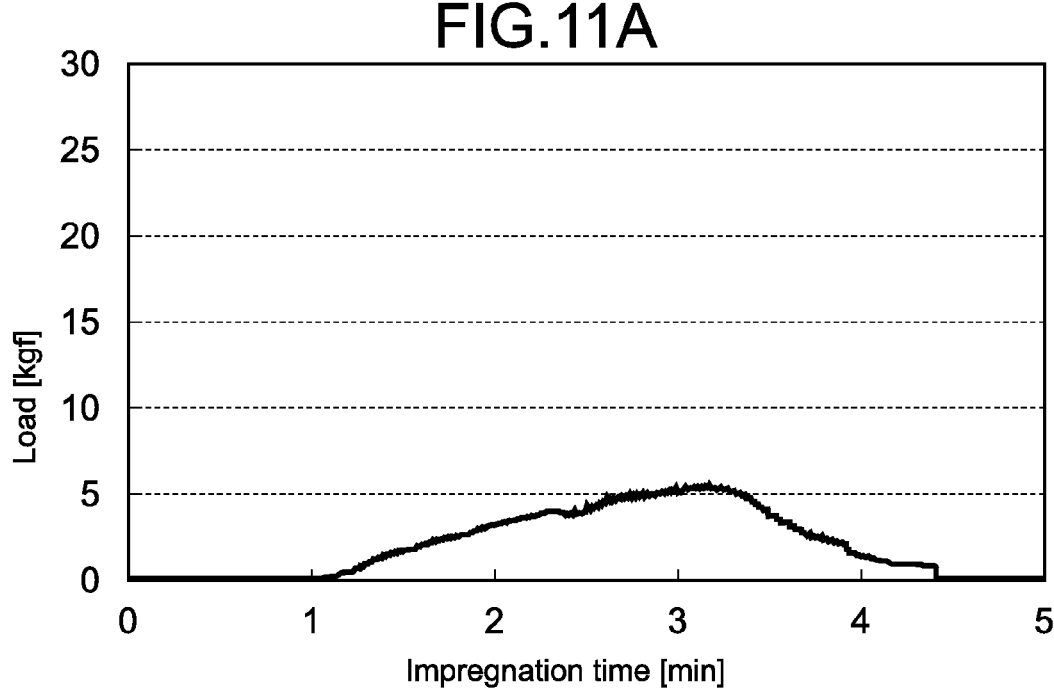
FIGS. 11A and 11B are graphs showing fracture curves in the cases where the test piece was subjected to the process of impregnation using other impregnating adhesives that are used for a purpose of bonding soft objects out of cyanoacrylate-based adhesives.
Figure 11B:
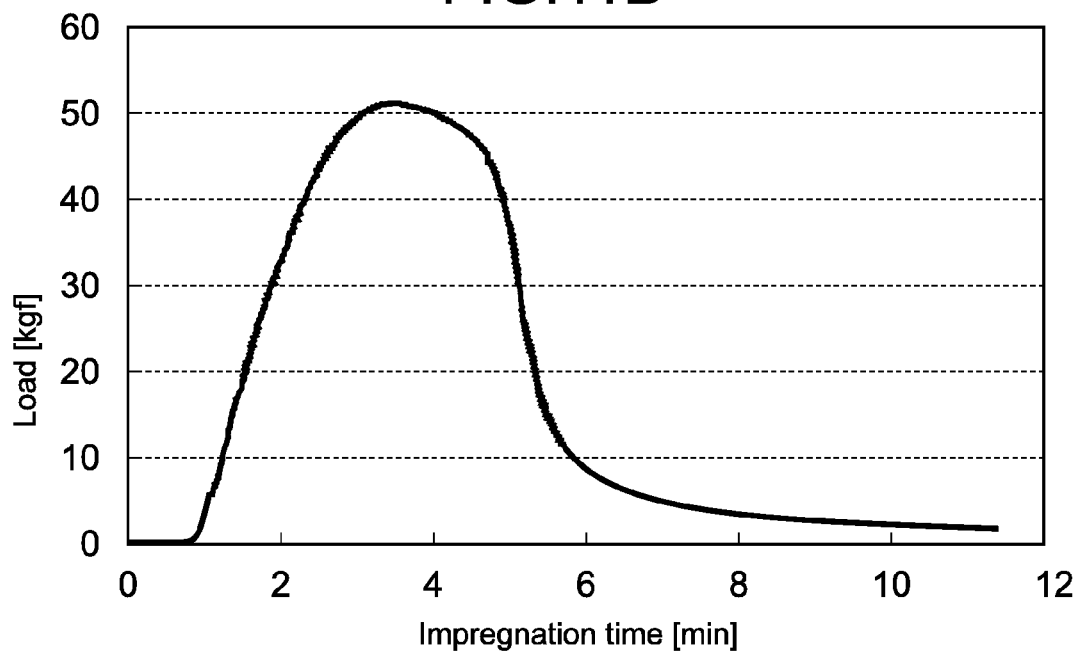

FIGS. 11A and 11B are graphs showing fracture curves in the cases where the test piece was subjected to the process of impregnation using other impregnating adhesives that are used for a purpose of bonding soft objects out of cyanoacrylate-based adhesives. For both in the cases of FIGS. 11A and 11B, the viscosity was 2 to 100 (Pa*s (cP)). This experiment showed that it is possible to control the intensity of the structural object to be formed by the process of impregnation.

The structural object including at least two layers each having different intensities as described above, would serve as a model resembling a periosteum of a bone of the human body, for example. The bone mainly includes cortical bone forming its outside, and cancellous bone forming the inside. In the structural object including two layers, the surface part having high intensity is a part that resembles the cortical bone, and the inner part becomes a part that resembles the cancellous bone. Their hardness, the thickness of the cortical bone and the like vary depending on age and sex, but this structural object is suitable as a bone model. Such a bone model is able to be used in a surgical simulation for cutting the bone in the field of medical treatment and others. The intensity of the surface part of such a structural object may desirably be for example, 10 times or more and 250 times or less larger than that of the inner part.

In the past, shaped objects of bones was formed of gypsum powder by using a mold or the like, but the adhesive component amount or the adhesive impregnation rate might not be constant, and it might be difficult to obtain high intensity ratio between its inside and outside. In particular, since there was a variation in the impregnation amount of the adhesive by each structural object in the case where the adhesive was impregnated manually, there was also an occurrence of variation in hardness. In contrast to this, according to the embodiment of the present disclosure, by properly making selection of the powder material and the control of the impregnation rate of the impregnating adhesive by controlling the degree of drying of the structure body, it is made possible to solve the above-mentioned problem.

Figure 16:
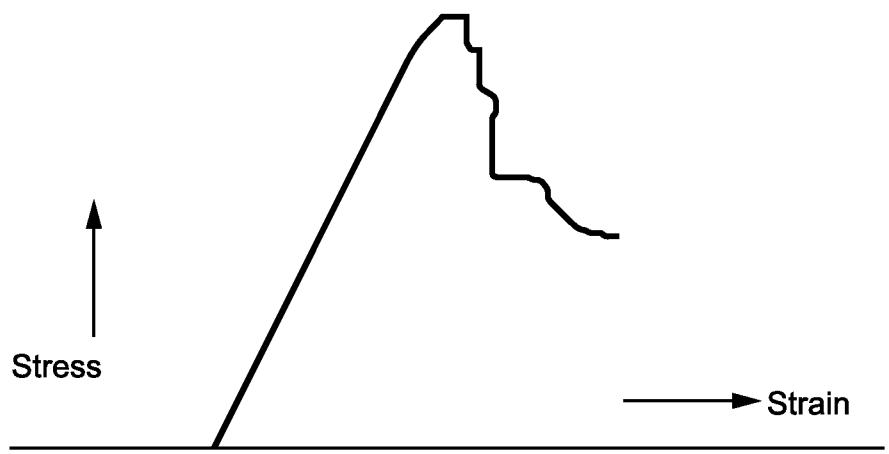
FIG. 16 is a graph showing a bending stress of a femur of a mouse.

FIG. 16 is a graph showing a bending strength of a femur of a mouse.

This graph is cited from the homepage of Kureha Special Laboratory Co., Ltd. (http://www.kureha-bunseki.co.jp/field/bone_02.html, at the time of application on which the present application is based.)

Curve profile of the bending stress in the femur of the mouse is thus similar to those of the structural objects that were manufactured according to the embodiment of the present disclosure as shown in FIGS. 7 and 8 and the like. Curve profile of the bending stress of human bone can also be considered to be similar to that of the mouse. However, since the sizes of the body of human and mouse are different, the stress value itself which was shown in FIG. 16 is predicted to be materially different from that of the human.

(B) the Structure Body by Gypsum

By the rapid prototyping technology, using the inkjet print head, an ink in which the adhesive is contained was ejected to the powder of gypsum, and thus the test piece of the structure body was formed. The structure body of gypsum freshly-formed by the modeling apparatus contains moisture, and gypsum itself would be solidified by the moisture.

(1) As a result of measuring the intensity of the test piece by gypsum described above, the following characteristics were obtained. In this example, the process of impregnation with the impregnating adhesive was not carried out. FIG. 12 is a graph showing the fracture curve at this time.

Weight after the process of impregnation: 11.5 (g)
Fracture load: 13.9 (kgf) (136 (N))

(2) As a result of performing the process of the impregnation with a cyanoacrylate-based adhesive on this structure body for a purpose of enhancing the intensity of the test piece of gypsum described above, the following characteristics of the structural object were obtained. FIG. 13 is a graph showing the fracture curve at this time.

Weight after the process of impregnation: 13.5 (g)
Fracture load: 47.9 (kgf) (470 (N))
Weight ratio of the adhesive: 14.8(%)

Figures 14, 15:
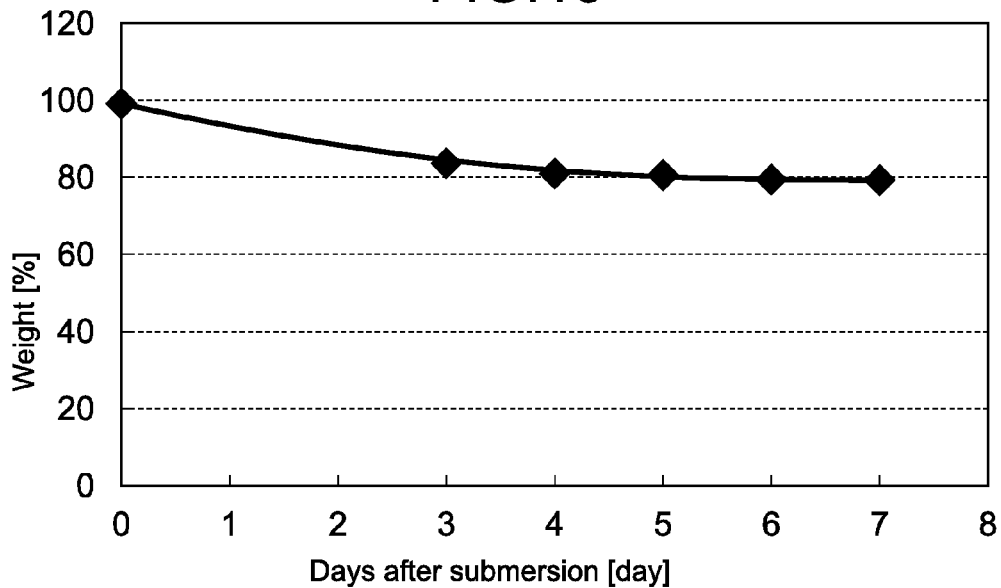
FIG. 14 is a table that summarizes the experimental results for the test pieces by gypsum.
FIG. 15 is a graph showing a change in weight in the case where a structural object whose main component is sodium chloride was submerged in water without the forming of the coating layer described in FIG. 2.

FIG. 14 is a table that summarizes the experimental results of the above for the test pieces by gypsum. Regarding the test piece freshly-formed by the modeling apparatus, that is, which has not been subjected to a drying process, its weight was assumed to be 100, and its fracture strength was assumed to be 1. Intensity ratio of the two was about three times.

Experimental Example 2 of Manufacturing a Structural Object

FIG. 15 is a graph showing a change in weight in the case where the structural object whose main component is sodium chloride was submerged in water without the forming of the coating layer described in FIG. 2. The weight of the structural object had decreased by 20% in one week, and this is because the sodium chloride had been eluted from the inside of the structural object. By providing the coating layer on the structural object, it is possible to prevent the elution of the material from the inside.

Further, by being provided with a smooth layer with low friction coefficient as in the above-mentioned fluorine-based coating layer, the coating layer of this structural object is able to serve as a model resembling the periosteum of the bone of the human body, and is suitable as a bone model.

Experimental Example 3 of Manufacturing a Structural Object

The inventors of the present disclosure used other types of impregnating adhesives to fabricate structural objects, with the structure body of the test pieces (15 by 15 by 42 (mm)) whose main component is sodium chloride, fabricated by the modeling apparatus by the rapid prototyping technology. In the following, examples of those which were inappropriate for the present disclosure, among the impregnating adhesives, will be mentioned.

(1) Polyester-Based

After the process of drying the test piece, the test piece was impregnated with an unsaturated polyester resin (from Meiden Chemical Co., Ltd., product name "Unicoat, No. 754XL"). Then, it was dried by heating at 100 degrees C. The fracture load was 8.0 (kgf). There was an odor generation when heated, and the intensity was weak. In addition, there was a discoloration of the color.

(2) Silicone-Based

After the process of drying the test piece, the test piece was impregnated with a de-alcohol type silicone (from Shin-Etsu Chemical Co., Ltd., product name "Silicone Resin KR-400"). Then, it was dried at normal temperature for 60 minutes. The fracture load was not able to be measured, and the curing was poor.

(3) Alcohol Solvent-Based

After the process of drying the test piece, the test piece was impregnated with a copolymer nylon polymerized product (from Toagosei Co., Ltd., product name "Aronmighty FS-1755V10"). Then, it was dried by heating at 120 degrees C. The fracture load was 11.7 (kgf), and the intensity was deficient.

(4) Alcohol Solvent-Based

After the process of drying the test piece, the test piece was impregnated with methoxymethylated nylon (from Nagase ChemteX Corporation, product name "Toresin F-30K"). Then, it was dried by heating at 100 degrees C. The fracture load was 16.6 (kgf), and the intensity was deficient.

(5) Epoxy-Based

After the process of drying the test piece, the test piece was impregnated with a low-viscosity epoxy resin (from Nissin Resin Co., Ltd., product name "Low-viscosity Epoxy Resin Z-1"). Then, it was dried at normal temperature. The fracture load was 19.5 (kgf), and the intensity was deficient.

(6) UV Curable Type

After the process of drying the test piece, the test piece was impregnated with an acrylic UV curable resin (from Toagosei Co., Ltd., product name "Aronix BU-510U"). Then, the structural object was cured by UV irradiation. The fracture load was not able to be measured, and the curing was poor. In addition, there was a change in color in the structural object.

Experimental Example 4 of Manufacturing a Structural Object

The inventors of the present disclosure used the cyanoacrylate-based impregnating adhesive to form structural objects, with the structure body of the test pieces (15 by 15 by 42 (mm)) whose main component is sodium chloride, fabricated by the modeling apparatus by the rapid prototyping technology. Then the coating layer which has been explained in the above-mentioned another embodiment was formed on these structural objects. In the following, examples of those which were inappropriate for the present disclosure, as the materials of the coating layer, will be mentioned.

(1) Spray Type Urethane Varnish

The coating layer was formed on the surface of the test piece, using a spray type urethane-based varnish (from Washin Paint Co., Ltd., product name "Oil spray varnish"). When allowing it to stand outdoors, there was moisture eluted.

(2) Spray Type Water Resistant Spray

The coating was formed on the surface of the test piece, using a spray type acrylic resin (from Buffalo Kokuyo Supply Inc., product name "Arvel Lightfast Waterproof Spray"). When allowing it to stand outdoors, there was moisture eluted.

(3) Vinyl Acetate Resin

The coating was formed on the surface of the test piece, using a vinyl acetate resin (from Konishi Co., Ltd., product name "Bond for Woodwork"). When allowing it to stand outdoors, there was moisture eluted.

(4) Acrylic Paint

The coating was formed on the surface, using an acrylic paint (from Shinto Family Co., Ltd., product name "Clear Lacquer"). When allowing it to stand outdoors, it absorbed moisture. In addition, there was an odor.

Other Embodiments

The present disclosure is not limited to the embodiments described above and can be modified without departing from the gist of the present disclosure.

In the embodiment described above, the example has been explained, that the structure body formed by the modeling apparatus was being used as a model resembling a subject (for example, a bone). However, the structure body (structural object) may be used, besides as the model, also in a form to compose the whole or part of a product.

At least two features of the features in each embodiment described above may be combined with each other.

The present disclosure may also be configured as follows.

(1) A method of manufacturing a structural object, the method including:
  using rapid prototyping technology, forming a structure body from a powder material whose main component is a water-soluble compound; and
  impregnating the formed structure body with an adhesive that provides adhesive function upon reaction with moisture contained in the structure body.

(2) The method according to (1), in which
  in the process of impregnation with the adhesive, an impregnation rate of the adhesive to the structure body is controlled in such a manner that the structural object to be obtained by the impregnation with the adhesive has an inner part in which the adhesive is not contained and a surface part in which the adhesive is contained.

(3) The method according to (1) or (2), further including:
  drying the structure body before the structure body is impregnated with the adhesive.

(4) The method according to (3), in which
  the drying of the structure body includes heating the structure body.

(5) The method according to (2), in which
  an intensity of the surface part of the structural object to be obtained by the impregnation with the adhesive is 10 times or more and 250 times or less relative to an intensity of the inner part.

(6) The method according to (2), further including:
  forming a hole penetrating through from the surface part to the inner part of the structural object to be obtained by the impregnation; and
  forming a hollow structure at least at a part of the inner part, by injecting a solvent for the powder material and eluting the powder material, in the formed hole.

(7) The method according to any one of (1) to (6), in which
  a technology of modeling with powders out of the rapid prototyping technology is used.

(8) The method according to any one of (1) to (7), in which
  the main component of the powder material is sodium chloride.

(9) A structural object, including:
  a structure body that has a powder material whose main component is a water-soluble compound, and has been formed by solidifying the powder material by adhesive function of a first adhesive,
  the structure body being impregnated with a second adhesive that provides adhesive function upon reaction with moisture contained in the structure body.

(10) The structural object according to (9), in which
  the structure body has
  an inner part in which the second adhesive is not contained, and
  a surface part that has been cured by the second adhesive, provided to cover the inner part.

(11) The structural object according to (10), in which
  an intensity of the surface part is 10 times or more and 250 times or less relative to an intensity of the inner part.

(12) The structural object according to any one of (9) to (11), in which
  the main component of the powder material is sodium chloride.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 structural object
11 inner part
12 surface part
13 coating layer

The invention claimed is:

1. A method of manufacturing a structural object, the method comprising:
  using rapid prototyping technology, forming a structure body from a powder material whose main component is a water-soluble compound; and
  impregnating, at an impregnation rate, the formed structure body with an adhesive that provides adhesive function upon reaction with moisture contained in the structure body,
  wherein the impregnation rate of the adhesive to the structure body is controlled in such a manner that the structural object to be obtained by the impregnation with the adhesive has an inner part in which the adhesive is not contained and a surface part in which the adhesive is contained.

2. The method according to claim 1, further comprising:
  drying the structure body before the structure body is impregnated with the adhesive.

3. The method according to claim 2, wherein the drying of the structure body includes heating the structure body.

4. The method according to claim 1, wherein
an intensity of the surface part of the structural object to be obtained by the impregnation with the adhesive is 10 times or more and 250 times or less relative to an intensity of the inner part.

5. The method according to claim 1, further comprising:
forming a hole penetrating through from the surface part to the inner part of the structural object to be obtained by the impregnation; and
forming a hollow structure at least at a part of the inner part by injecting a solvent for the powder material and eluting the powder material in the formed hole.

6. The method according to claim 1, wherein a technology of modeling with powders out of the rapid prototyping technology is used.

7. The method according to claim 1, wherein the main component of the powder material is sodium chloride.

8. The method according to claim 1, further comprising:
drying the structure body before the structure body is impregnated with the adhesive, and
wherein the impregnation rate of the adhesive to the structure body is controlled by controlling a degree of drying of the structure body during the drying of the structure body.

9. The method according to claim 1, wherein
the structure body is a three-dimensional body, and
the impregnation of the three-dimensional body is performed at the impregnation rate such that each face of the three-dimensional body contains the adhesive.

* * * * *